(12) United States Patent
Malur Srinivasan et al.

(10) Patent No.: US 10,732,937 B2
(45) Date of Patent: Aug. 4, 2020

(54) PROGRAMMING BY VOICE

(71) Applicant: FUJITSU LIMITED, Kawasaki-shi, Kanagawa (JP)

(72) Inventors: Ramya Malur Srinivasan, Sunnyvale, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/799,978

(22) Filed: Oct. 31, 2017

(65) Prior Publication Data

US 2019/0129695 A1    May 2, 2019

(51) Int. Cl.
| | |
|---|---|
| G06F 9/44 | (2018.01) |
| G06F 8/35 | (2018.01) |
| G10L 15/22 | (2006.01) |
| G10L 15/18 | (2013.01) |
| G10L 15/26 | (2006.01) |
| G06N 20/00 | (2019.01) |
| G06F 40/30 | (2020.01) |
| G06F 40/253 | (2020.01) |
| G06F 8/30 | (2018.01) |

(52) U.S. Cl.
CPC .............. *G06F 8/35* (2013.01); *G06F 40/253* (2020.01); *G06F 40/30* (2020.01); *G06N 20/00* (2019.01); *G10L 15/1815* (2013.01); *G10L 15/22* (2013.01); *G10L 15/26* (2013.01); *G06F 8/30* (2013.01); *G10L 15/1822* (2013.01); *G10L 2015/223* (2013.01)

(58) Field of Classification Search
CPC ........................................................ G06F 9/44
USPC ......................................... 717/104–108, 114
See application file for complete search history.

(56) References Cited

U.S. PATENT DOCUMENTS

| | | | | |
|---|---|---|---|---|
| 7,404,177 | B1 * | 7/2008 | Greenfield | G06F 9/541 717/106 |
| 7,426,468 | B2 * | 9/2008 | Coifman | G10L 15/26 704/270 |
| 2003/0110040 | A1 * | 6/2003 | Holland | G10L 15/26 704/275 |
| 2006/0111904 | A1 * | 5/2006 | Wasserblat | G10L 17/00 704/246 |

(Continued)

OTHER PUBLICATIONS

Dinisan ("How to use multiple voice commands at once with Google Assistant"), Nov. 30, 2017 (Year: 2017).*

(Continued)

*Primary Examiner* — Jae U Jeon
(74) *Attorney, Agent, or Firm* — Maschoff Brennan

(57) ABSTRACT

According to an aspect of an embodiment, a method may include receiving vocal input that includes conversational language describing a computer program to be generated. The method may also include generating input text based on the vocal input. The input text may be representative of the conversational language describing the computer program. The method may additionally include generating an intent layout based on the input text. The method may include generating an execution layout based on the intent layout. The execution layout may include computer programming language based on the intent layout. The method may also include generating the computer program based on the computer programming language included in the execution layout.

19 Claims, 7 Drawing Sheets

(56) References Cited

U.S. PATENT DOCUMENTS

| | | | | |
|---|---|---|---|---|
| 2009/0216525 A1* | 8/2009 | Shostak | ............... | G06F 40/211 |
| | | | | 704/9 |
| 2014/0207446 A1* | 7/2014 | Klein | ..................... | G10L 21/10 |
| | | | | 704/233 |
| 2016/0092405 A1* | 3/2016 | Lee | ....................... | G06F 40/106 |
| | | | | 715/202 |
| 2016/0092428 A1* | 3/2016 | Ilic | ....................... | G06F 40/295 |
| | | | | 715/765 |
| 2018/0314951 A1* | 11/2018 | Sadamasa | ............... | G06N 5/04 |
| 2018/0329512 A1* | 11/2018 | Liao | ..................... | G10L 15/265 |

OTHER PUBLICATIONS

Andreas, J., Rohrbach, M., Darrell, T., & Klein, D. (Jun. 7, 2016). Learning to compose neural networks for question answering. arXiv preprint arXiv:1601.01705.

Snell, L., & Cunningham, M. J. (2000). An investigation into programming by voice and development of a toolkit for writing voice-controlled applications. M. Eng. Report, Imperial College of Science, Technology and Medicine, London.

Masuoka, C. (2008). Java programming using voice input: Adding Java support to voicecode.

Desilets, A. (2001). VoiceGrip: a tool for programming-by-voice. International Journal of Speech Technology, 4(2), 103-116.

Begel, A. B. (2005). Spoken language support for software development (Doctoral dissertation, University of California, Berkeley).

Dragon Naturally Speaking http://www.nuance.com/dragon/index.htm retrieved Nov. 1, 2017.

https://github.com/paulproteus/pycon-talk retrieved Nov. 1, 2017.

https://voicecode.io retrieved Nov. 1, 2017.

https://nlp.stanford.edu/software/lex-parser.shtml retrieved Nov. 1, 2017.

https://cloud.google.com/speech retrieved Nov. 1, 2017.

Mou, L., Men, R., Li, G., Zhang, L., & Jin, Z. (2015). On end-to-end program generation from user intention by deep neural networks. arXiv preprint arXiv:1510.07211.

* cited by examiner

PROGRAMMING BY VOICE

FIELD

The embodiments discussed in the present disclosure are related to generating computer programs by voice.

BACKGROUND

A computer program may be generated using vocal input by converting the vocal input to a textual format. Typically, in order for the computer program to be properly generated, the vocal input needs to be in a pseudo-syntax format of a programming language. Alternatively, in order for the computer program to be properly generated, the vocal input may need to be semantically identical to text code of the programming language.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include receiving vocal input that includes conversational language describing a computer program to be generated. The method may also include generating input text based on the vocal input. The input text may be representative of the conversational language describing the computer program. The method may additionally include generating an intent layout based on the input text. The method may include generating an execution layout based on the intent layout. The execution layout may include computer programming language based on the intent layout. The method may also include generating the computer program based on the computer programming language included in the execution layout.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

In some instances, a system for generating a computer program may use vocal input to generate the computer program. The vocal input may be received from a user and provided to a parser which may generate a text file representative of the vocal input.

Some conventional systems may require that the user have specific knowledge of a computer programming language including syntax and semantic formats. These systems may require that the vocal input be in a syntax and semantic format that is the same as the format used by the computer programming language. These systems may operate slower than generating a computer program using a keyboard, due to the additional steps of converting the vocal input to the text file and verifying the syntax and semantic format of the vocal input.

According to one or more embodiments described in the present disclosure, a computer program may be quickly generated using vocal input that includes conversational language. The vocal input may be received from a user by a parser which may generate input text representative of the vocal input. An intent layout module may receive the input text and may generate multiple intent generation models based on the input text. An intent layout selection module may receive and score the intent generation models. The intent layout selection module may provide the intent generation model having the highest score as an intent layout to a second parser. The second parser may generate an intermediate text representative of the intent layout. An execution layout module may receive the intermediate text and may generate multiple execution generation models based on the intermediate text. The execution generation models may include computer programming language. An execution layout selection module may receive and score the execution generation models. The execution layout may generate the computer program based on the computer programming language included in the execution generation model having the highest score.

Embodiments of the present disclosure are explained with reference to the accompanying drawings.

Figure 1:
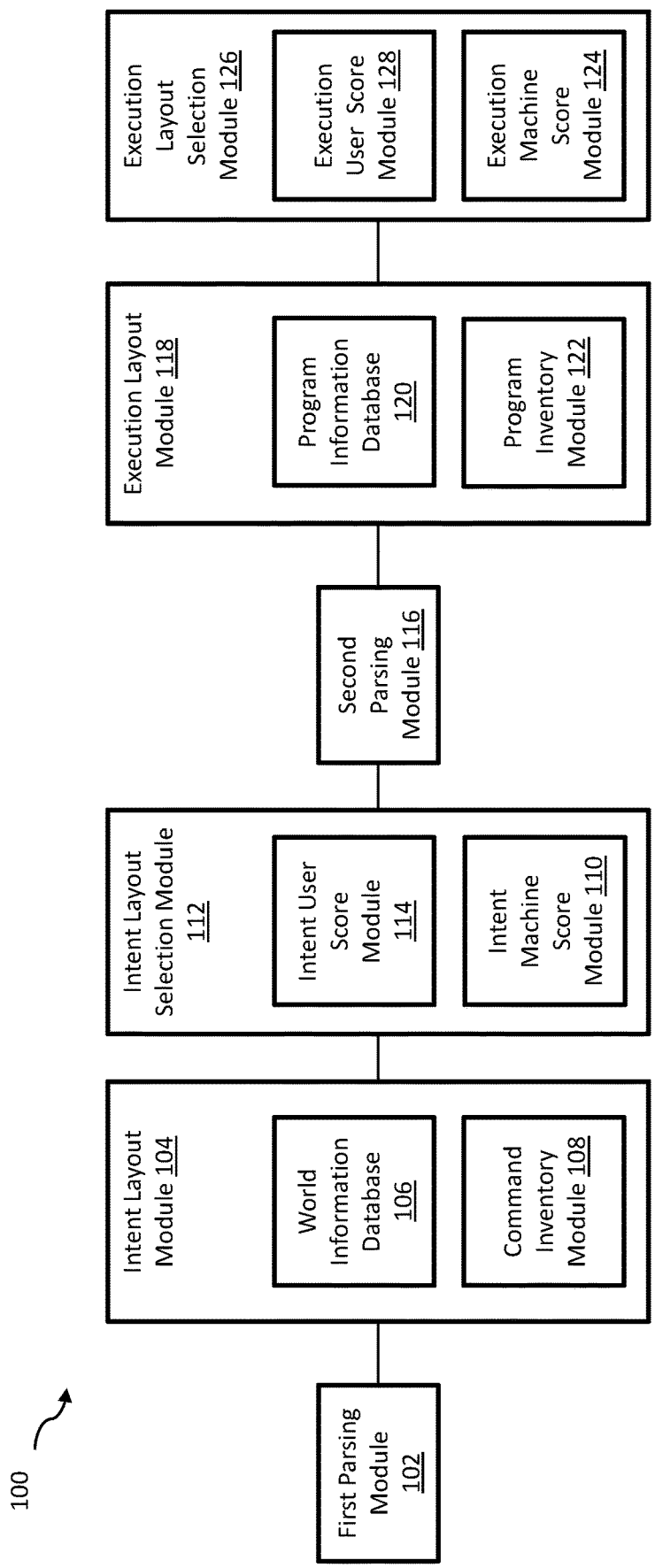
FIG. 1 illustrates an example system for generating a computer program using vocal input.

FIG. 1 illustrates a system 100 for generating a computer program using vocal input, arranged in accordance with at least one embodiment described herein. The system 100 may include a first parsing module 102 configured to receive vocal input. The first parsing module 102 may be configured to generate input text representative of the vocal input. The input text may be received by an intent layout module 104 to generate and output multiple intent generation models. Each of the intent generation models may be received and scored by an intent layout selection module 112. An intent generation model having a highest combined intent score may be output by the intent layout selection module 112 as an intent layout. The intent layout may be received by a second parsing module 116 configured to generate an intermediate text representative of the intent layout. The intermediate text may be received by an execution layout module 118 to generate and output multiple execution generation models. Each of the execution generation models may be received and scored by an execution layout selection module 126. An execution generation model having a highest combined intent score may be selected as an execution layout.

The computer program may be generated based on the execution layout. For example, the system 100 may be used to generate a computer program that creates a list of even prime numbers (referred to herein as "the prime number example").

The first parsing module 102 may include code and routines configured to generate the input text. The first parsing module 102 may be configured to perform a series of operations with respect to the vocal input that may be used to generate the input text. For example, the first parsing module 102 may be configured to receive (e.g., obtain) the vocal input including conversational language (e.g., natural speaking language) describing the computer program to be generated. In some embodiments, the vocal input may include a single sentence covering a single aspect of the computer program to be generated. Additionally or alternatively, the vocal input may include multiple sentences covering one or more aspects of the computer program to be generated. In the prime number example, the vocal input may include the following sentence "create a list of even prime numbers."

The first parsing module 102 may be configured to convert the vocal input to an intermediate input text representative of the conversational language describing the computer program to be generated. In the prime number example, the first parsing module 102 may convert the vocal input to a text form including "create a list of even prime numbers." The first parsing module 102 may be configured to extract parts of speech from the intermediate input text. For example, the parts of speech may include verbs, nouns, prepositions, or any other suitable part of speech included in the intermediate input text. As another example, the parts of speech may include various syntax and/or semantic parts of speech included in the intermediate input text. In the prime number example, the extracted parts of speech may include "create," "prime," "even," and/or "numbers."

According to some embodiments, the first parsing module 102 may generate multiple syntax relational trees between the parts of speech to be included in the input text. The input relational syntax trees may conform to grammatical rules of the language used in the vocal input.

The intent layout module 104 may include a world information database 106 and a command inventory module 108. The intent layout module 104 including the world information database 106 and the command inventory module 108 may include code and routines configured to receive the input text and generate the multiple intent generation models. For example, the intent layout module 104 may be configured to receive the input text and determine the different parts of speech that are included in the input text using the relational syntax trees included in the input text.

In some embodiments, the intent layout module 104 may determine multiple intent generation models of the input text. Further, in some embodiments, the intent generation models may be limited by the subject matter described in the world information database 106. The probability of selecting an intent generation model within the multiple intent generation models as the intent layout may be determined according to equation 1:

$$P(z|x;\theta_i)=[z]_w,\qquad \text{Equation 1}$$

In equation 1, z may be the intent generation model, x may be the input text, $\theta_i$ may be various model parameters, and w may be the world information database. The various model parameters may include a number of neurons to be used, a number of layers to be included, and other hyper parameters. In some embodiments, the model parameters may be associated or include similar values in various iterations of generating intent generation models and/or computer programs using vocal input.

In some embodiments, the world information database 106 may include world information about topics, relations of topics, or any other suitable information for computer programming. In these and other embodiments, the world information included in the world information database 106 may relate to a single subject. Additionally or alternatively, the world information included in the world information database 106 may relate to multiple subjects. For example, the world information may include definitions of math terms such as prime numbers, even numbers, Fibonacci series, Fourier transforms, and/or any other suitable information for computer programming.

Additionally, the intent layout module 104 may include and/or receive multiple portions of the world information (also referred to herein as "world information portions") included in the world information database 106. The multiple portions of the world information received from the world information database 106 may relate to the different parts of speech that are included in the input text. The intent layout module 104 may generate multiple intent layout terms, each intent layout term may be representative of a different portion of the world information received from the world information database 106. Each intent layout term may be representative of a part of speech included in the input text. In the prime number example, the intent layout module 104 may receive world information related to the terms "even," "prime," and/or "numbers" from the world information database 106 and the intent layout module 104 may generate an intent layout term representative of each of the terms "even," "prime," and/or "numbers."

The command inventory module 108 may include a repository of commands that act as logical connectors of the multiple intent layout terms. For example, the command inventory module 108 may include commands such as lookup, find, relate, describe, or any other suitable command for associating the multiple intent layout terms. In some embodiments, the commands included in the command inventory module 108 may be selected dynamically based on the different parts of speech included in the input text. Further, in some embodiments, the commands may be selected dynamically to increase the number of intent generation models that are generated so as to increase the probability that one or more intent generation models properly map different parts of speech included in the vocal input.

The intent layout module 104 may include and/or receive multiple commands from the command inventory module 108. The multiple commands received from the command inventory module 108 may be associated with the different parts of speech included in the input text. For example, a first command may be associated with nouns included in the input text, a second command may be associated with verbs and/or nouns included in the input text, and a third command may be associated with prepositions included in the input text.

An example command may be "lookup," which may be associated with nouns included in the input text and the intent layout module 104 may associate (e.g., link, connect, etc.) the command "lookup" with the nouns included in the input text. In the prime number example, the intent layout module 104 may associate the command "lookup" with the terms "prime" and may find correspondences from the world information database 106 with the noun "prime."

Another example command may be "find," which may be associated with nouns and/or verbs included in the input text and the intent layout module 104 may associate the command "find" with the nouns and/or verbs included in the input text. In the prime number example, the intent layout module 104 may associate the command "find" with the term "numbers" and may find correspondences from the world information database 106 with the noun "numbers."

Yet another example command may be "relate," which may be associated with prepositional phrases included in the input text and the intent layout module 104 may associate the command "relate" to the prepositional phrases included in the input text. In the prime number example, the intent layout module 104 may associate the command "relate" with the terms "prime" and "numbers" and may find correspondences from the world information database 106 with "prime" and "numbers" related. In some embodiments, the commands received from the command inventory module 108 may include the term "and," which may associate two or more intent layout terms for the command "relate."

The intent layout module 104 may generate multiple intent layout fragments by associating the various intent layout terms with different commands received from the command inventory module 108. In the prime number example, the intent layout module 104 may generate multiple intent layout fragments that include a first intent layout fragment of "lookup [prime]" and a second intent layout fragment of "lookup [numbers]."

The intent layout module 104 may generate the multiple intent generation models by combining multiple intent layout fragments using one or more commands received from the command inventory module 108. For example, the command "describe" may be used to generate the intent generation models. The command "describe" may be used to associate the results of the commands lookup, find, relate, and/or any other suitable command for computer programming. In the prime number example, the command "describe" may be used to associate the results of looking up "prime," finding "numbers," and/or relating "prime" with "numbers" discussed above. For example, the command "describe" may cause a weighted average of any associated commands to be determined. The weighted average may be used to predict the intent generation models using neural networks. Additionally or alternatively, the intent layout fragments may be associated with each other through different terms such as "and," "or," or any other suitable terms for associating the different intent layout fragments. Example intent generation models and/or intent layouts with regards to the prime number example are discussed below in relation to FIGS. 2A and 2B.

In some embodiments, different parts of speech may be mapped to different intent layout depths in the intent generation models. For example, a first part of speech may be mapped to a first intent layout depth and a second part of speech may be mapped to a second intent layout depth. In these and other embodiments, the various intent layout depths may indicate a different priority for the parts of speech mapped to different intent layout depths.

The intent layout selection module 112 may include an intent user score module 114 and an intent machine score module 110. The intent layout selection module 112 including the intent user score module 114 and the intent machine score module 110 may include code and routines configured to receive and score the multiple intent generation models and output the intent layout. For example, the intent layout selection module 112 may receive the intent generation models.

The intent machine score module 110 may be configured to operate in parallel or independently of the intent user score module 114. According to some embodiments, the intent machine score module 110 may determine an intent machine score for each intent generation model according to equation 2:

$$s(z_i|x)=a\sigma(Bh(x)+Cf(x)+d), \quad \text{Equation 2}$$

In equation 2, h(x) may be an encoding of the input text (e.g., the output of the first parsing module 102), $z_i$ may be the $i^{th}$ intent generation model, $f(z_i)$ may be a feature vector representing the $i^{th}$ intent generation model, a; B; C; and d may be model parameters that are learned by the intent machine score module 110. The intent machine scores may be normalized to determine a probability distribution as defined in equation 3:

$$P(z_i|x; \theta i) = \frac{\exp(s(z_i|x))}{\Sigma_0^i \exp(s(z_i|x))}, \quad \text{Equation 3}$$

In equation 3, $s(z_i|x)$ may be the intent machine score of the $i^{th}$ intent generation model, $\theta_i$ may be the various model parameters discussed above, and x may be the input text. The intent layout selection module 112 may determine the normalized intent machine scores for each intent generation model.

The intent user score module 114 may be configured to operate in parallel or independently of the intent machine score module 110. The intent user score module 114 may be configured to receive input from a user (also referred to herein as "user input"). In some embodiments, the user input may be binary and may include a one or a zero, with one indicating the intent generation model properly describes the computer program to be generated and zero indicating the intent generation model does not properly describe the computer program to be generated. In these and other embodiments, the user input may include a score from a range of values. For example, the range of values may be zero to fifty with fifty being high and zero being low. The intent user score module 114 may be configured to determine an intent user score for each intent generation model based on user input.

The intent user score may indicate whether the intent generation models properly describe the computer program to be generated. For example, an intent user score of one may indicate that an intent generation model closely describes the computer program to be generated and an intent user score of zero may indicate that an intent generation model does not closely describe the computer program to be generated. The intent layout selection module 112 may receive the intent user score for each intent generation model. Additionally or alternatively, the intent user score module 114 may be configured to determine an intent user score for a portion of the intent generation models and the intent layout selection module 112 may receive the intent user score for each intent generation model included in the portion of the intent generation models. For example, a portion of the intent generation models may include the same or similar intent machine score and the intent user score module 114 may receive an intent user score for the portion of intent generation models that include the same or similar intent machine scores. In some embodiments, the intent user score may be used to determine which of the intent generation models that include the same or similar intent machine scores is to be selected as the intent layout.

In some embodiments, the intent layout selection module 112 may be configured as a neural network module. In these and other embodiments, the intent layout selection module 112 may be configured to provide data to the intent layout module 104 to update the world information database 106 and/or the command inventory module 108 based on the intent machine score and/or the intent user score. For example, a user may provide input indicating general preferences and/or the intent user score for the different intent layout fragments. In some embodiments, the general preferences may include user preferences for command types, parts of speech, or any other suitable preference for intent layout fragments. The intent layout selection module 112 may determine a pattern in the intent layout fragment scoring based on the user input and may provide data representative of the general preferences or patterns to the intent layout module 104. The intent layout module 104 may update the world information database 106 and/or the command inventory module 108 based on the provided data. Additionally or alternatively, the intent layout selection module 112 may be configured to update the model parameters based on the general preferences and/or the patterns.

The intent layout selection module 112 may be configured to determine the combined intent score by combining the intent machine score with a corresponding intent user score for each intent generation model. In some embodiments, the intent machine score or the intent user score may be weighted to give priority to one scoring technique over the other. For example, the intent user score may be weighted over the intent machine score since it may be more likely a user will know which intent generation model more closely describes the computer program to be generated. In some embodiments, a single intent generation model may receive a highest combined intent score. In these embodiments, the single intent generation model that has the highest combined intent score may be output as the intent layout. Additionally or alternatively, two or more intent generation models may receive the highest combined intent score and the two or more intent generation models may be output as intent layouts.

The second parsing module 116 may include code and routines configured to generate the intermediate text. The second parsing module 116, which may receive the intent layout, may be configured to perform a series of operations with respect to the intent layout to generate the intermediate text.

The second parsing module 116 may be configured to convert the intent layout to the intermediate text representative of the intent layout. Further, the second parsing module 116 may be configured to extract relevant programming information from the intermediate text. For example, the relevant program information may include syntax and semantic structures related to computer programming such as search, for loop, if else, or any other suitable syntax and/or semantic structure. The intermediate text may represent the intent layout in a text format.

The execution layout module 118 may include a program information database 120 and a program inventory module 122. The execution layout module 118 including the program information database 120 and the program inventory module 122 may include code and routines configured to receive the intermediate text and generate the multiple execution generation models. For example, the execution layout module 118 may be configured to receive the intermediate text and determine different commands and world information included in the intent layout represented in the intermediate text.

The execution layout module 118 may determine the multiple execution generation models based on the intermediate text. The probability of an execution generation model within the multiple execution generation models being selected may be determined according to equation 4:

$$P(y|z;\theta_e)=[y]_z \qquad \text{Equation 4}$$

In equation 4, z may be the intent layout, y may be the execution generation model, and $\theta_e$ may be the various model parameters. The various model parameters may include a number of neurons to be used, a number of layers to be included, and other hyper parameters. In some embodiments, the model parameters may be associated or include similar values in various iterations of generating execution generation models and/or computer programs using vocal input.

In some embodiments, the program information database 120 may include programming information about different programming functions for one or more computer programming languages. For example, the program information database 120 may include information about programming arrays, programming functions, programming structures, or any other suitable programming function and/or information for the one or more computer programming languages. In these and other embodiments, the one or more computer programming languages may be pre-programmed during a setup of the system 100. Additionally or alternatively, the one or more computer programming languages may be selected by a user (e.g., during use of the system 100). For example, a user may select the one or more computer programming languages to be used in the vocal input. As another example, a user may select the one or more computer programming languages to be used while providing the user score of the intent generation models.

In some embodiments, the program information database 120 may include programming information for programming electronic devices. For example, the program information database 120 may include programming information for programming a television, an oven, or any other suitable electronic device. In these and other embodiments, the program information database 120 may include programming information for programming multiple electronic devices to operate in parallel. For example, the program information database 120 may include programming information for turning on a furnace and setting a temperature of a refrigerator.

The execution layout module 118 may include and/or receive multiple program information portions of the programming information included in the program information database 120. Each portion of the programming information may describe a computer program function corresponding to an intent layout fragment. The execution layout module 118 may generate multiple execution layout terms, each execution layout term may be representative of a different portion of the program information received from the program information database 120. In the prime number example, the execution layout module 118 may receive program information related to the layout fragments "lookup [prime]," "lookup [numbers]," and "lookup [even]" and the execution layout module 118 may generate an execution layout term representative of each of the intent layout fragments "lookup [prime]," "lookup [numbers]," and "lookup [even]."

The program inventory module 122 may include a repository of computer programming language keywords. In some embodiments, the program inventory module 122 may include functional keywords such as if-then, while, or any other functional keyword suitable for computer programming. In these and other embodiments, the program inventory module 122 may include data-type keywords such as int, float, double, char, or any other suitable data-type keywords. The keywords may be selected based on the different intent layout fragments. The keywords may be used to map the intent layout fragments to different execution layout fragments. In some embodiments, the program inventory module 122 may include a repository of pseudocodes/computer programs that have previously been programmed and/or generated.

The execution layout module 118 may receive multiple keywords from the program inventory module 122. The multiple keywords received may be associated with the different intent layout fragments included in the intent layout.

The execution layout module 118 may generate multiple execution layout fragments by associating the various execution layout terms with different keywords. Additionally or alternatively, the execution layout module 118 may receive one or more of the pseudocodes/computer programs from the program inventory module 122.

The execution layout module 118 may generate multiple execution generation models by combining multiple execution layout fragments using one or more keywords. The execution layout fragments may be associated with each other through different terms such as "and," "or," or any other suitable terms for associating the different execution layout fragments. An example execution generation model and/or execution layout is discussed below in relation to FIG. 3.

The execution layout selection module 126 may include an execution user score module 128 and an execution machine score module 124. The execution layout selection module 126 including the execution user score module 128 and the execution machine score module 124 may include code and routines configured to receive and score the multiple execution generation models and generate the computer program based on an execution generation model that has a highest combined execution score (e.g., the execution layout). For example, the execution layout selection module 126 may receive the execution generation models.

The execution machine score module 124 may be configured to operate in parallel or independently of the execution user score module 128. In some embodiments, the execution machine score module 124 may determine an execution machine score for each execution generation model according to equation 5:

$$s(y_i|x) = e\sigma(Fh(x) + Gf(x) + k), \quad \text{Equation 5}$$

In equation 5, $h(x)$ may be an encoding of the intermediate text (e.g., the output of the second parsing module 116), $y_i$ may be the $i^{th}$ execution generation model, $f(y_i)$ may be a feature vector representing the $i^{th}$ execution generation model, e; F; G; and k may be model parameters that are learned by the execution machine score module 124 similar to the machine learning discussed above in relation to the intent layout selection module 112 and the intent layout module 104, and $\sigma$ may be a sigmoid function. In some embodiments, the sigmoid function may be implemented in neural networks and may perform a squashing function. The execution machine scores may be normalized to determine a probability distribution as defined in equation 6:

$$P(y|z; \theta e) = \frac{\exp(s(y_i|z))}{\Sigma_0^i \exp(s(y_i|z))}, \quad \text{Equation 6}$$

In equation 6, $s(y_i|z)$ may be the execution machine score of the $i^{th}$ execution generation model, $\theta_e$ may be the various model parameters discussed above, and z may be the intent layout. The execution layout selection module 126 may determine the normalized execution machine score for each execution generation model.

The execution user score module 128 may be configured to operate in parallel or independently of the execution machine score module 124. The execution user score module 128, which may receive input from a user, may be configured to determine an execution user score for each execution generation model based on the user input. In some embodiments, the user input may be binary and may include a one or a zero, with one indicating the execution generation model properly describes the computer program to be generated and zero indicating the execution generation model does not properly describe the computer program to be generated. In these and other embodiments, the user input may include a score from a range of values. For example, the range of values may be zero to fifty with fifty being high and zero being low. Additionally or alternatively, the execution user score module 128 may be configured to determine an execution user score for the one or more pseudocodes/computer programs received from the program inventory module 122.

The execution user score may indicate whether the execution generation models provide the proper output for the computer program to be generated. For example, an execution user score of one may indicate that the execution generation model closely provides the proper output for the computer program to be generated and an execution user score of zero may indicate that the execution generation model does not closely provide the proper output for the computer program to be generated. The execution layout selection module 126 may receive the execution user score for each execution generation model. Additionally or alternatively, the execution user score module 128 may be configured to receive an execution user score for a portion of the execution generation models and the execution layout selection module 126 may receive the execution user score for each execution generation model included in the portion of the execution generation models. For example, a portion of the execution generation models may include the same or similar execution machine scores and the execution user score module 128 may receive an execution user score for the portion of execution generation models that include the same or similar execution machine scores.

In some embodiments, the execution user score module 128 may be configured to receive an execution user score for each execution layout fragment generated. For example, three different execution layout fragments may be generated based on a first intent layout fragment, each of the three different execution layout fragments may be presented to the user and an execution user score may be received for each execution layout fragment. The execution layout fragment having the highest execution user score may be mapped to the first intent layout fragment. In these and other embodiments, this process may be performed for each intent layout fragment.

In some embodiments, the execution layout may be determined based on the execution generation model that has the highest execution machine score. In these and other embodiments, if two or more execution generation models receive the same or similar execution machine scores, the execution user score may be used to select the execution layout.

The execution layout selection module 126 may be configured to determine the combined execution score by combining the execution machine score for each execution generation model with a corresponding user execution score. In some embodiments, the execution machine score or the execution user score may be weighted to give priority to one scoring technique over the other. For example, the execution user score may be weighted over the execution machine score since it may be more likely a user will know which execution generation model more closely provides the proper output for the computer program to be generated. In some embodiments, a single execution generation model may receive a highest combined execution score. In these embodiments, the computer program may be generated based on the computer programming language included in the single execution generation model that has the highest combined execution score (e.g., the execution layout). Additionally or alternatively, two or more execution generation models may receive the highest combined execution score and the computer program may be generated based on the computer programming language included in the two or more execution generation models (e.g., the execution layouts).

In the prime number example, a first execution generation model and a second execution generation model may be presented to the user to determine execution user layout scores for the various execution generation models. A first function of both the first execution generation model and the second execution generation model may instruct the program to loop through even numbers, setting i equal to the even numbers. A second function of the first execution generation model may instruct the program to loop through numbers starting at two to number divided by two, setting j equal to the looped numbers. Meanwhile, a second function of the second execution generation model may instruct the program to loop through numbers starting at one to number divided by two, setting j equal to the looped numbers. A third function of both the first execution generation model and the second execution generation model may instruct the program to exit the loop if no value for j is a factor of a value for i. A fourth function of both the first execution generation model and the second execution generation model may instruct the program to print i. The first execution generation model may output a value of two and the second execution generation model may output no values. Based on these results, the execution user score for the first execution generation model may be set to one and the execution user score for the second execution generation model may be set to zero. In the prime number example, the first execution generation model may be selected as the execution layout and the computer program may be generated based on computer programming language included in the first execution generation model.

In some embodiments, the execution layout selection module 126 may be configured as a neural network module. In these and other embodiments, the execution layout selection module 126 may be configured to provide data to the execution layout module 118 to update the program information database 120 and/or the program inventory module 122 based on the execution machine score and/or the execution user score. For example, a user may provide input indicating general preferences or the execution user score for the different execution layout fragments. In some embodiments, the general preferences may include user preferences for keywords, pseudocode, or any other suitable preference for execution layout fragments. The execution layout selection module 126 may determine a pattern in the execution layout fragment scoring based on the user input and may provide data representative of the general preferences or patterns to the execution layout module 118. The execution layout module 118 may update the program information database 120 and/or the program inventory module 122 based on the provided data. Additionally or alternatively, the execution layout selection module 126 may be configured to update the model parameters based on the general preferences and/or the patterns.

The system 100 may determine if more of the computer program is to be generated based on the vocal input or if more vocal input is to be received. For example, the vocal input may include four sentences and the computer program may be a computer program portion generated based on a first sentence in the vocal input and the system 100 may determine there are three sentences (e.g., three computer programming portions) remaining to be processed. The system 100 may repeat the process discussed above for each subsequent sentence in the vocal input or each subsequent vocal input received from the user.

Generating a computer program based on conversational language may allow computer programs to be generated without a user needing to know specific programming language syntax or structure. Additionally, generating a computer program based on conversational language may allow computer programs to be generated in any computer programming language loaded in the program information database 120 without needing to learn the different computer programming languages.

In some embodiments, the first parsing module 102 may include a speech to text conversion module and/or a conversation language parser. The speech to text conversion module may be configured to convert the vocal input to the intermediate input text using an application programming interface (API). The conversational language parser may analyze the intermediate input text to extract the relevant information and form the relational syntax trees to be included in the input text.

Modifications, additions, or omissions may be made to FIG. 1 without departing from the scope of the present disclosure. For example, the system 100 may include more or fewer elements than those illustrated and described in the present disclosure. In some embodiments operations may be performed in a different order from what is described above.

Figure 2A:
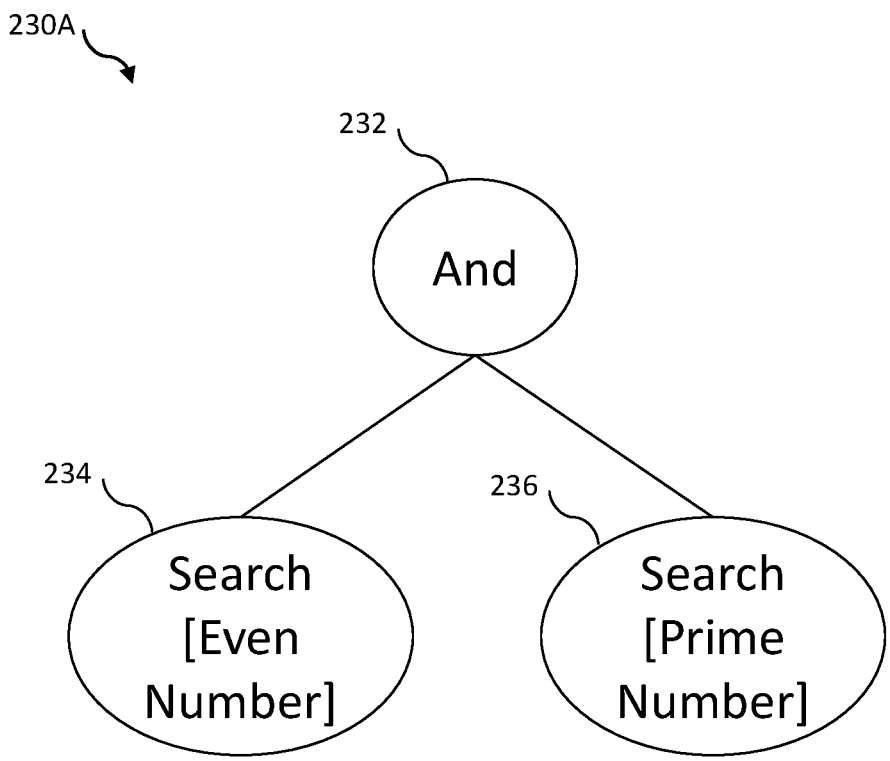
FIG. 2A illustrates an example intent layout, which may be used for generating a computer program using vocal input.
Figure 2B:
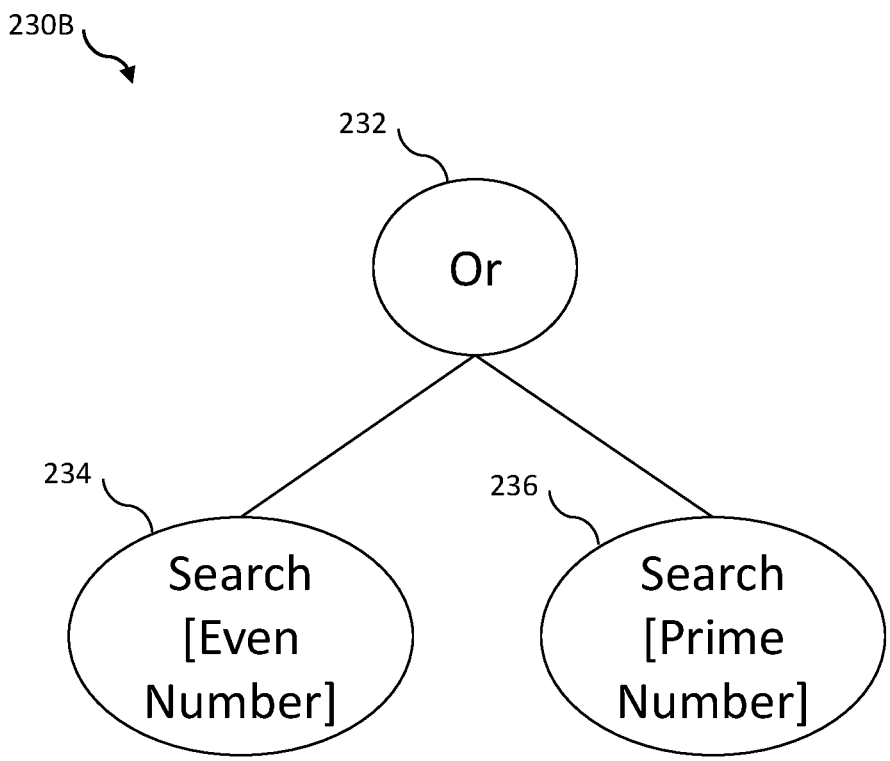
FIG. 2B illustrates another example intent layout, which may be used for generating a computer program using vocal input.

FIGS. 2A and 2B illustrate example intent layout 230A and intent layout 230B (collectively 'intent layouts 230'), which may be used for generating a computer program using vocal input. The intent layouts 230 may be representative of vocal input received from a user and the intent layouts 230 may be used to determine an intent of the user for the computer program. With combined reference to FIGS. 2A and 2B, the intent layouts 230 may be generated as either an intent generation model or an intent layout by an intent layout module such as the intent layout module 104 of FIG. 1. The intent layouts 230 may relate to the prime number example discussed above in relation to FIG. 1.

The intent layouts 230 may include a first intent layout fragment 234, a second intent layout fragment 236, and a third intent layout fragment 232. Both the first intent layout fragment 234 and the second intent layout fragment 236 may include world information received from a world information database such as the world information database 106 of FIG. 1. For example, the first intent layout fragment 234 may include world information related to even numbers, which is illustrated in FIGS. 2A and 2B as [Even Number]. As another example, the second intent layout fragment 236 may include world information related to prime numbers, which is illustrated in FIGS. 2A and 2B as [Prime Number].

Additionally, both the first intent layout fragment 234 and the second intent layout fragment 236 may include commands received from a command inventory module such as the command inventory module 108 of FIG. 1. For example, both the first intent layout fragment 234 and the second intent layout fragment 236 may include a command "Search." The command "Search" may indicate that the computer program is to search for an entity described by the world information included in the first intent layout fragment 234 and the second intent layout fragment 236. For example, in relation to the first intent layout fragment 234, the computer program may search for even numbers. Likewise, in relation to the second intent layout fragment 236, the computer program may search for prime numbers.

The first intent layout fragment 234 and the second intent layout fragment 236 may be associated by the third intent layout fragment 232. The third intent layout fragment 232 may include a command from the command inventory module. The command included in the third intent layout fragment 232 may associate the commands and the world information of the first intent layout fragment 234 and the second intent layout fragment 236. For example, the third intent layout fragment 232 may include a command "And" (as illustrated in FIG. 2A), which may indicate that the computer program is to search for even numbers "And" search for prime numbers. As another example, the third intent layout fragment 232 may include a command "Or" (as illustrated in FIG. 2B), which may indicate that the computer program is to search for even numbers "Or" search for prime numbers. In these and other embodiments, the first intent layout fragment 234 and/or the second intent layout fragment 236 may be considered branches of the third intent layout fragment 232.

Additionally, the third intent layout fragment 232 may be considered a first layer (e.g., a first depth) of the intent layouts 230 and the first intent layout fragment 234 and the second intent layout fragment 236 may be considered a second layer (e.g., a second depth) of the intent layouts 230.

The intent layouts 230 may be provided to an intent layout selection module such as the intent layout selection module 112 of FIG. 1. The intent layout selection module may generate an intent machine score and/or receive an intent user score for both intent layouts 230 as discussed above in relation to FIG. 1.

Modifications, additions, or omissions may be made to FIGS. 2A and 2B without departing from the scope of the present disclosure. For example, the intent layouts 230 may include more or fewer intent layout fragments than those illustrated and described in the present disclosure. As another example, the intent layouts 230 may include more or less branches of intent layout fragments. Additionally, the intent layouts 230 may include more or less layers. In some embodiments operations may be performed in a different order from what is described above.

Figure 3:
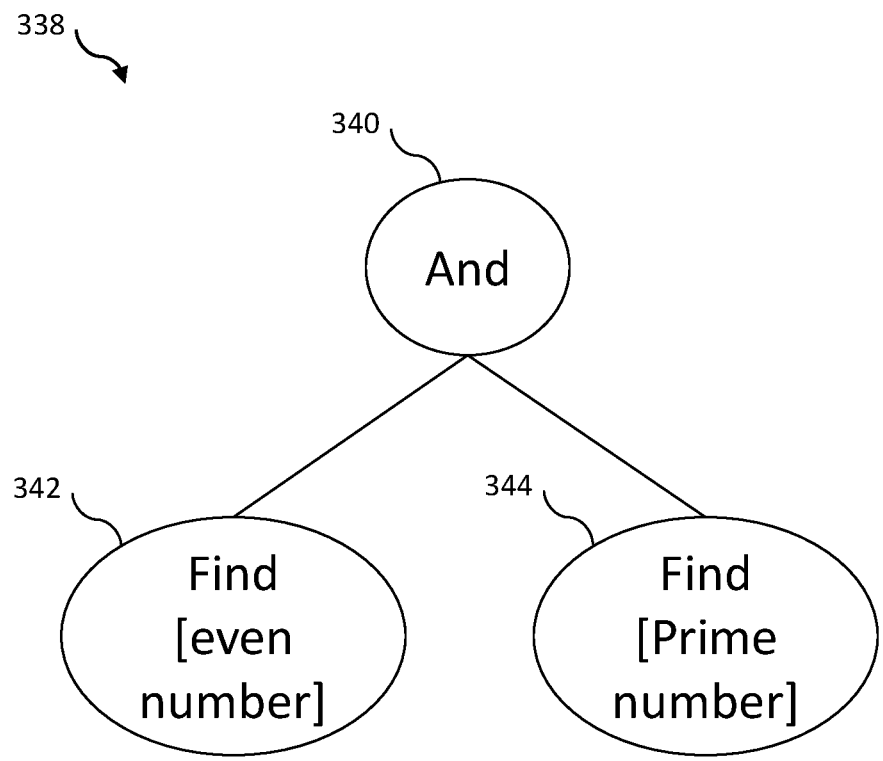
FIG. 3 illustrates an example execution layout, which may be used for generating a computer program using vocal input.

FIG. 3 illustrates an example execution layout 338, which may be used for generating a computer program using vocal input. The execution layout 338 may be generated as either an execution generation model or an execution layout by an execution layout module such as the execution layout module 118 of FIG. 1. The execution layout 338 may be representative of an intent layout, such as the intent layouts 230 of FIGS. 2A and 2B. The execution layout 338 may be representative of the computer program to be generated. The execution layout 338 may relate to the prime number example discussed above in relation to FIG. 1.

The execution layout 338 may include a first execution layout fragment 342, a second execution layout fragment 344, and a third execution layout fragment 340. The execution layout 338 illustrated in FIG. 3 may be generated based on the intent layout 230A illustrated in FIG. 2A. Each intent layout fragment of the intent layout 230A may be mapped to an execution layout fragment. In some embodiments, the intent layout fragments may be mapped to an execution layout fragment at a ratio of 1:1, 1:2, or any other suitable ratio for generating an execution layout representative of the intent layout. For example, the first intent layout fragment 234 (see FIGS. 2A and 2B) may be mapped to the first execution layout fragment 342, the second intent layout fragment 236 (see FIGS. 2A and 2B) may be mapped to the second execution layout fragment 344, and the third intent layout fragment 232 (see FIGS. 2A and 2B) may be mapped to the third execution layout fragment 340.

Both the first execution layout fragment 342 and the second execution layout fragment 344 may include program information received from a program information database such as the program information database 120 of FIG. 1. For example, the first execution layout fragment 342 may include program information related to even numbers, and the second execution layout fragment 344 may include program information related to prime numbers. The program information included in the first execution layout fragment 342 may be based on the world information included in the first intent layout fragment 234. Likewise, the program information included in the second execution layout fragment 344 may be based on the world information included in the second intent layout fragment 236.

Additionally, both the first execution layout fragment 342 and the second execution layout fragment 344 may include keywords received from a program inventory module such as the program inventory module 122 of FIG. 1. For example, both the first execution layout fragment 342 and the second execution layout fragment 344 may include a keyword "Find." The keyword included in the first execution layout fragment 342 may be based on the command included in the first intent layout fragment 234 (see FIGS. 2A and 2B). Likewise, the keyword included in the second execution layout fragment 344 may be based on the command included in the second intent layout fragment 236 (see FIGS. 2A and 2B).

The keyword "Find" may indicate that the computer program language is to include routines to find the program information included in the first execution layout fragment 342 and the second execution layout fragment 344. For example, in relation to the first execution layout fragment 342, the computer program language may include a routine to find even numbers. Likewise, in relation to the second execution layout fragment 344, the computer program language may include a routine to find prime numbers.

The first execution layout fragment 342 and the second execution layout fragment 344 may be associated by the third execution layout fragment 340. The third execution layout fragment 340 may include a keyword from the program inventory module. The keyword included in the third execution layout fragment 340 may associate the keywords and the program information of the first execution layout fragment 342 and the second execution layout fragment 344. For example, the third execution layout fragment 340 may include a keyword "And," which may indicate that the computer program language is to include routines to find even numbers "And" find prime numbers. In these and other embodiments, the first execution layout fragment 342 and/or the second execution layout fragment 344 may be considered branches of the third execution layout fragment 340.

Additionally, the third execution layout fragment 340 may be considered a first layer (e.g., a first depth) of the execution layout 338 and the first execution layout fragment 342 and the second execution layout fragment 344 may be considered a second layer (e.g., a second depth) of the execution layout 338.

The execution layout 338 may be provided to an execution layout selection module such as the execution layout selection module 126 of FIG. 1. The execution layout selection module may generate an execution machine score and/or receive an execution user score for each execution layout fragment (e.g., the first execution layout fragment 342, the second execution layout fragment 344, and/or the third execution layout fragment 340) and/or the execution layout 338 as discussed above in relation to FIG. 1.

Additionally, the various execution layout fragments may be generated and scored incrementally. For example, in an embodiment where execution layout fragments are generated at a ratio greater than 1:1, each execution layout fragment may receive an execution machine score and/or an execution user score and the execution layout fragment in the execution layout 338 for each intent layout fragment may be generated incrementally based on the execution layout fragment that has a higher combined score. In these and other embodiments, the execution layout may be generated a single execution layout fragment at a time.

Modifications, additions, or omissions may be made to FIG. 3 without departing from the scope of the present disclosure. For example, the execution layout 338 may include more or fewer execution layout fragments than those illustrated and described in the present disclosure. As another example, the execution layout 338 may include more or less branches of the execution layout fragments. Additionally, the execution layout 338 may include more or less layers. In some embodiments operations may be performed in a different order from what is described above.

Figure 4:
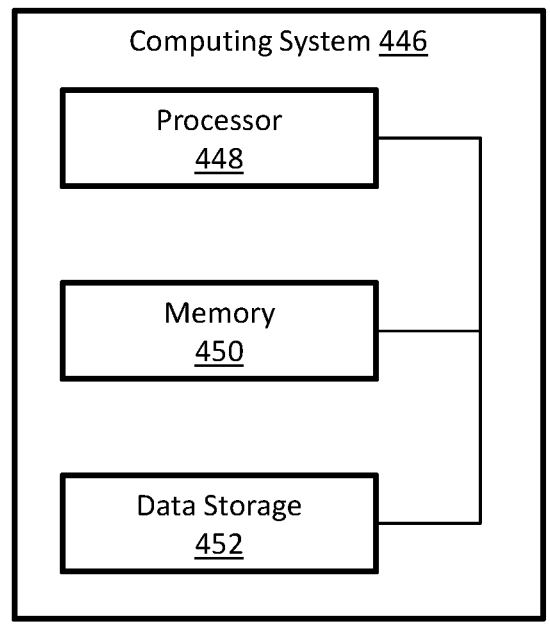
FIG. 4 illustrates an example computing system that may be configured to generate a computer program using vocal input.

FIG. 4 illustrates an example computing system 446 that may be configured to generate a computer program using vocal input. The computing system 446 may be configured to implement or direct one or more operations associated with a parsing module (e.g., the first parsing module 102 and/or the second parsing module 116 of FIG. 1), an intent layout module (e.g., the intent layout module 104 of FIG. 1), an intent layout selection module (e.g., the intent layout selection module 112 of FIG. 1), an execution layout module (e.g., the execution layout module 118 of FIG. 1), and/or an execution layout selection module (e.g., the execution layout selection module 126 of FIG. 1). The computing system 446 may include a processor 448, a memory 450, and a data storage 452. The processor 448, the memory 450, and the data storage 452 may be communicatively coupled, e.g., via a communication bus.

In general, the processor 448 may include any suitable special-purpose or general-purpose computer, computing entity, or processing device including various computer hardware or software modules and may be configured to execute instructions stored on any applicable computer-readable storage media. For example, the processor 448 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 448 may include any number of processors configured to, individually or collectively, perform or direct performance of any number of operations described in the present disclosure. Additionally, one or more of the processors may be present on one or more different electronic devices, such as different servers.

In some embodiments, the processor 448 may be configured to interpret and/or execute program instructions and/or process data stored in the memory 450, the data storage 452, or the memory 450 and the data storage 452. In some embodiments, the processor 448 may fetch program instructions from the data storage 452 and load the program instructions in the memory 450. After the program instructions are loaded into memory 450, the processor 448 may execute the program instructions.

For example, in some embodiments, the parsing module, the intent layout module, the intent layout selection module, the execution layout module, and/or the execution layout selection module may be included in the data storage 452 as program instructions. The processor 448 may fetch the program instructions of the parsing module, the intent layout module, the intent layout selection module, the execution layout module, and/or the execution layout selection module from the data storage 452 and may load the program instructions of the parsing module, the intent layout module, the intent layout selection module, the execution layout module, and/or the execution layout selection module in the memory 450. After the program instructions of the parsing module, the intent layout module, the intent layout selection module, the execution layout module, and/or the execution layout selection module are loaded into the memory 450, the processor 448 may execute the program instructions such that the computing system may implement the operations associated with the parsing module, the intent layout module, the intent layout selection module, the execution layout module, and/or the execution layout selection module as directed by the instructions.

The memory 450 and the data storage 452 may include computer-readable storage media for carrying or having computer-executable instructions or data structures stored thereon. Such computer-readable storage media may include any available media that may be accessed by a general-purpose or special-purpose computer, such as the processor 448. By way of example such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 448 to perform a certain operation or group of operations.

Modifications, additions, or omissions may be made to the computing system 446 without departing from the scope of the present disclosure. For example, in some embodiments, the computing system 446 may include any number of other components that may not be explicitly illustrated or described.

Figure 5:
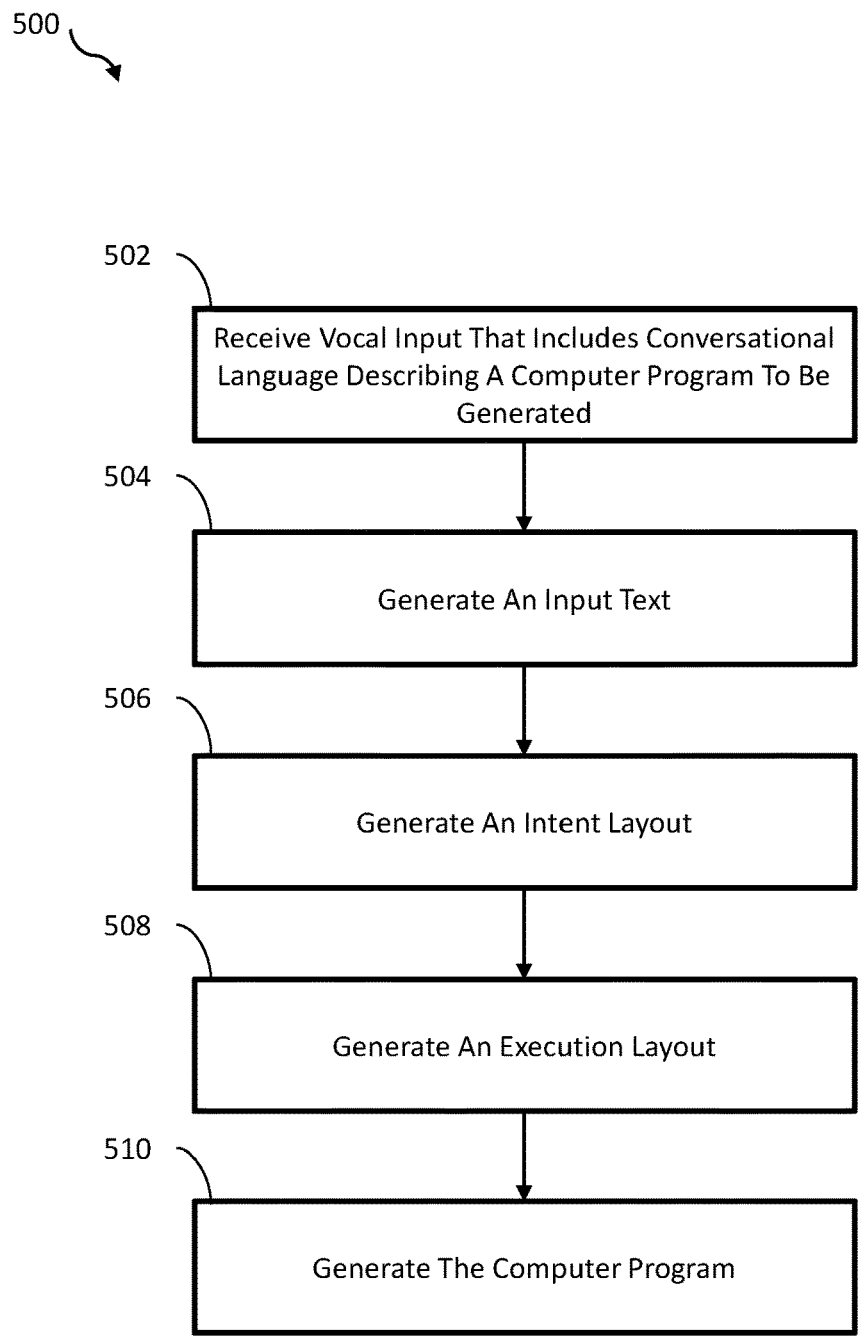
FIG. 5 illustrates a flowchart of an example method of generating a computer program using vocal input.

FIG. 5 illustrates a flowchart of an example method 500 of generating a computer program using vocal input, according to at least one embodiment described in the present disclosure. The method 500 may be performed by any suitable system, apparatus, or device with respect to receiving and/or processing vocal input (e.g., the vocal input discussed in relation to FIG. 1). For example, the first parsing module 102, the intent layout module 104, the intent layout selection module 112, the second parsing module 116, the execution layout module 118, and/or the execution layout selection module 126 of FIG. 1 and/or the computing system 446 of FIG. 4 (e.g., as directed by a first parsing module, an intent layout module, an intent layout selection module, a second parsing module, an execution layout module, and/or an execution layout selection module) may perform or direct performance of one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may include a block 502, at which vocal input that includes conversational language describing a computer program to be generated may be received. For example, the first parsing module (such as the first parsing module 102 of FIG. 1) may receive the vocal input that includes conversational language describing the computer program to be generated. At block 504, an input text may be generated. The input text may be generated based on the vocal input. For example, the first parsing module may generate the input text based on the vocal input. At block 506, an intent layout may be generated. The intent layout may be generated based on the input text. For example, an intent layout module and/or an intent layout selection module (such as the intent layout module 104 and/or the intent layout selection module 112 of FIG. 1) may receive the input text and may generate the intent layout based on the input text.

At block 508, an execution layout may be generated. The execution layout may be generated based on the intent layout. For example, an execution layout module and/or an execution layout selection module (such as the execution layout module 118 and/or the execution layout selection module 126 of FIG. 1) may receive the intent layout and may generate the execution layout based on the intent layout. At block 510, the computer program may be generated. The computer program may be generated based on programming language included in the execution layout. For example, the execution layout selection module may generate the computer program based on computer programming language included in the execution layout.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 6:
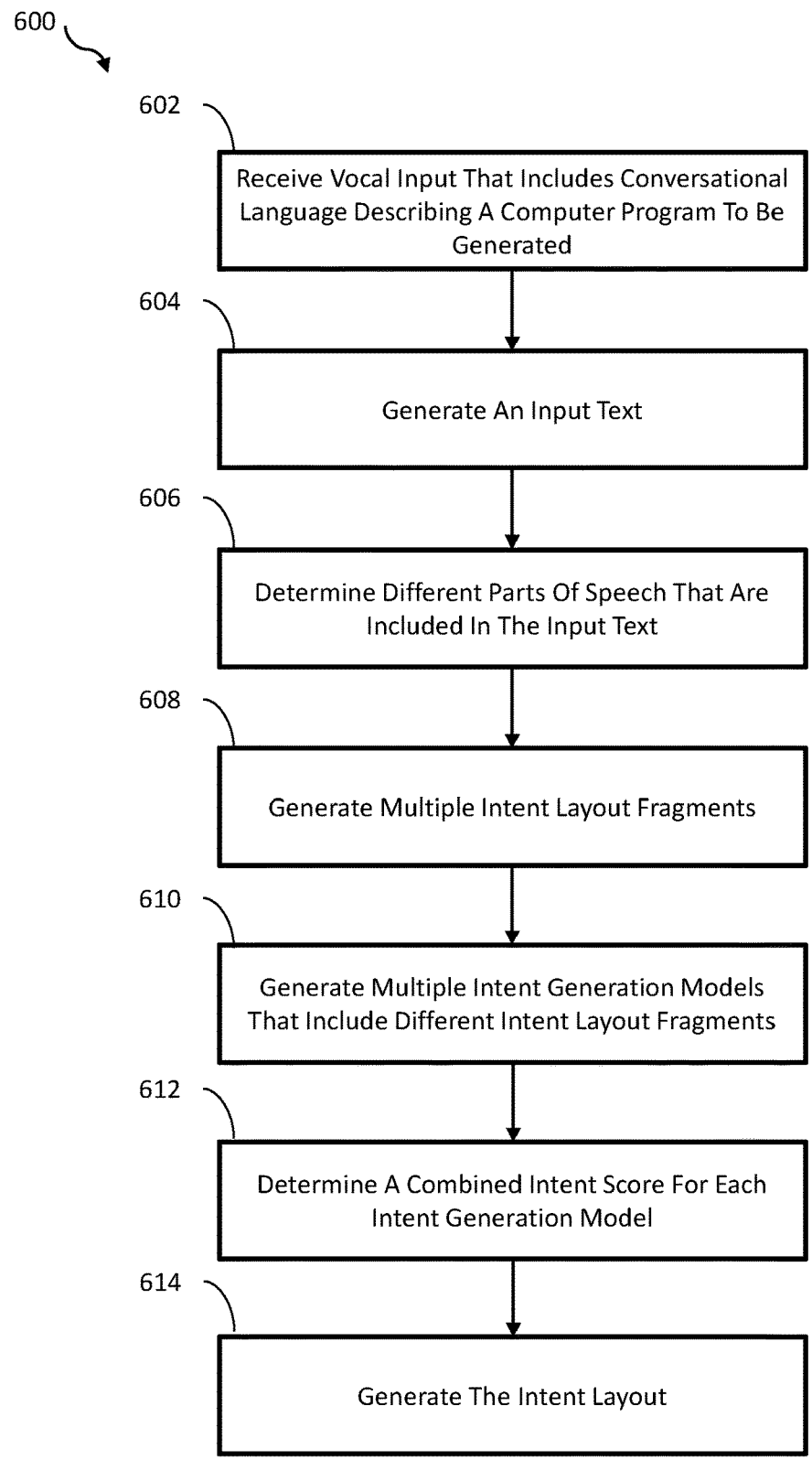
FIG. 6 illustrates a flowchart of an example method of generating an intent layout using vocal input.

FIG. 6 illustrates a flowchart of an example method 600 of generating an intent layout using vocal input, according to at least one embodiment described in the present disclosure. The method 600 may be performed by any suitable system, apparatus, or device with respect to vocal input (e.g., the vocal input discussed in relation to FIG. 1). For example, the first parsing module 102, the intent layout module 104, and/or the intent layout selection module 112, of FIG. 1 and/or the computing system 446 of FIG. 4 (e.g., as directed by a first parsing module, an intent layout module, and/or an intent layout selection module) may perform or direct performance of one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may include a block 602, at which vocal input that includes conversational language describing a computer program to be generated may be received. The block 602 of FIG. 6 may be similar or comparable to the block 502 of FIG. 5. At block 604, an input text may be generated. The block 604 of FIG. 6 may be similar or comparable to the block 504 of FIG. 5. At block 606, different parts of speech that are included in the input text may be determined. For example, a first parsing module (such as the first parsing module 102 of FIG. 1) may determine the different parts of speech that are included in the input text. At block 608, multiple intent layout fragments may be generated. The multiple intent layout fragments may be generated based on the input text. For example, an intent layout module (such as the intent layout module 104 of FIG. 1) may receive the input text and may generate the multiple intent layout fragments (such as the intent layout fragments 232, 234, and/or 236 of FIGS. 2A and 2B) based on the input text. At block 610, multiple intent generation models that include different intent layout fragments may be generated. For example, the intent layout module may generate the multiple intent generation models that include different intent layout fragments by associating the different intent layout fragments. At block 612, a combined intent score for each intent generation model may be determined. The combined score may be determined based on an intent machine score and/or an intent user score. For example, an intent layout selection module (such as the intent layout selection module 112 of FIG. 1) may receive the multiple intent generation models and may determine the intent machine score and/or receive the intent user score for each intent generation model. The intent layout selection module may determine the combined intent score based on the intent machine score and/or the intent user score. At block 614, the intent layout may be generated. The intent layout may be generated based on the intent generation model that has a highest combined intent score. For example, the intent layout selection module may generate the intent layout based on the intent generation model that has the highest combined score.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer (e.g., the processor 448 of FIG. 4) including various computer hardware or software modules, as discussed in greater detail below. Further, as indicated above, embodiments described in the present disclosure may be implemented using computer-readable media (e.g., the memory 450 of FIG. 4) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of generating a program based on vocal input, the method comprising:
   receiving vocal input that includes conversational language describing a computer program to be generated;
   generating input text based on the vocal input, wherein the input text is representative of the conversational language describing the computer program; generating an intent layout based on the input text;
   generating an execution layout based on the intent layout, generating the execution layout including:
   generating a plurality of execution layout fragments based on the intent layout;
   generating a plurality of execution generation models based on the execution layout fragments;
   determining an execution machine score for each execution generation model based on a mathematical combination of a scalar multiplier, a rectified linear function, learned weight matrices, the intent layout, and a feature vector representing the execution generation model; and
   generating the execution layout based on the execution generation model having a highest execution machine score; and
   generating the computer program based on the computer program functions corresponding to the execution layout.

2. The method of claim 1, wherein generating an intent layout based on the input text, comprises:
   determining different parts of speech that are included in the input text; generating a plurality of intent layout fragments, wherein each intent layout fragment is based on one of the determined different parts of speech included in the input text;
   generating a plurality of intent generation models that each include two or more intent layout fragments of the plurality of intent layout fragments, and associate the two or more intent layout fragments with each other;
   determining a combined intent score for each intent generation model; and generating the intent layout based on the intent generation model having a highest combined intent score.

3. The method of claim 2, wherein determining a combined intent score for each intent generation model comprises:
   determining an intent machine score for each intent generation model; determining an intent user score for each intent generation model; and determining the combined intent score for each intent generation model based on at least one of the intent machine score and the intent user score.

4. The method of claim 3, wherein determining the intent machine score for each intent generation model is determined according to $s(zi|x)=A*o(Bh(x)+Cf(x)+D)$, wherein A represents the scalar multiplier, o represents the rectified linear function, B and C represent the learned weight matrices, D represents a scalar constant, x is the input text, h(x) is an encoding of the input text, zi is the intent layout, and f(zi) is the feature vector representing the intent layout.

5. The method of claim 1, wherein generating the intent layout based on the input text comprises:
   determining different parts of speech that are included in the input text; receiving world information based on the different parts of speech included in the input text, wherein the world information describes subject matter corresponding to the different parts of speech;
   receiving a command inventory for associating the subject matter described in the world information, wherein the command inventory includes different types of commands for associating the different parts of speech; and
   generating the intent layout based on the world information, the command inventory, and the input text.

6. The method of claim 1, wherein the execution machine score for two or more execution generation models is the same, the method further comprising:
   determining an execution user score for each execution generation model; and determining a combined execution score for each execution generation model based on the execution machine score and the execution user score, wherein the execution layout is generated based on the execution generation model having a highest combined execution score.

7. The method of claim 1, wherein generating the intent layout based on the input text comprises:
   determining a first intent layout fragment including a first intent layout term representing a first noun of the input text and a first command associated with the first intent layout term, the first command determined based on the input text;
   determining a second intent layout fragment including a second intent layout term representing a second noun of the input text and a second command associated with the second intent layout term, the second command determined based on the input text; and
   determining a third command associated with the first intent layout fragment and the second intent layout fragment, wherein the intent layout includes the first intent layout fragment, the second intent layout fragment, and the third command.

8. A non-transitory computer-readable medium having computer-readable instructions stored thereon that are executable by a processor to perform or control performance of operations comprising:
   receiving vocal input that includes conversational language describing a computer program to be generated;
   generating input text based on the vocal input, wherein the input text is representative of the conversational language describing the computer program;
   generating a plurality of intent layout fragments based on the input text;
   generating a plurality of intent generation models that each include at least first and second intent layout fragments of the plurality of intent layout fragments;
   determining an intent machine score for each intent generation model based on a mathematical combination of a scalar multiplier, a rectified linear function, learned weight matrices, the input text, the intent layout fragments included in the intent generation model, and a feature sector representing the intent layout fragments;
   determining an intent user score for each intent generation model;
   determining a combined intent score for each intent generation model based on at least one of the intent machine score and the intent user score;
   generating an intent layout based on the intent generation model having a highest combined intent score;
   generating an execution layout based on the intent layout, wherein the execution layout includes computer programming language based on the first intent layout fragment, the second intent layout fragment, and a third command related to at least one of the first and second intent layout fragments; and
   generating the computer program based on the computer programming language included in the execution layout.

9. The non-transitory computer-readable medium of claim 8, the operation of generating a plurality of intent layout fragments based on the input text and generating a plurality of intent generation models comprise:
   determining different parts of speech that are included in the input text,
   wherein each intent layout fragment is based on one of the determined different parts of speech included in the input text; and
   wherein each of the intent generation models associates the two or more intent layout fragments with each other.

10. The non-transitory computer-readable medium of claim 8, the operation of determining the intent machine score for each intent generation model is determined according to $s(zi|x)=A*o(Bh(x)+Cf(x)+D)$, wherein A represents the scalar multiplier, o represents the rectified linear function, B and C represent the learned weight matrices, D represents a scalar constant, x is the input text, h(x) is an encoding of the input text, zi is the intent layout fragments included in the intent generation model, and f(zi) is the feature vector representing the intent layout fragments.

11. The non-transitory computer-readable medium of claim 8, the operation of generating the intent layout based on the input text comprises:
   determining different parts of speech that are included in the input text;
   receiving world information based on the different parts of speech included in the input text, wherein the world information describes subject matter corresponding to the different parts of speech;
   receiving a command inventory for associating the subject matter described in the world information, wherein the command inventory includes different types of commands for associating the different parts of speech; and
   generating the intent layout based on the world information, the command inventory, and the input text.

12. The non-transitory computer-readable medium of claim 8, the operation of generating the execution layout based on the intent layout comprises:
   receiving program information based on the first and second intent layout fragments included in the intent layout, wherein the program information describes computer program functions corresponding to the first and second intent layout fragments included in the intent layout;
   receiving a program inventory based on the computer program functions described in the program information, wherein the program inventory includes multiple computer program functions;

generating an execution layout fragment for each of the computer program functions; generating a plurality of execution generation models based on the execution layout fragments;

determining an execution machine score for each execution generation model; and generating the execution layout further based on the execution generation model having a highest execution machine score.

13. The non-transitory computer-readable medium of claim 12, wherein the execution machine score for one or more execution generation models is the same, the operations further comprising:

determining an execution user score for each execution generation model; and determining a combined execution score for each execution generation model based on the execution machine score and the execution user score, wherein the execution layout is generated further based on the execution generation model having a highest combined execution score.

14. The non-transitory computer-readable medium of claim 8, wherein the first intent layout fragment includes a first intent layout term representing a first noun of the input text and a first command associated with the first intent layout term, the first command determined based on the input text;

wherein the second intent layout fragment includes a second intent layout term representing a second noun of the input text and a second command associated with the second intent layout term, the second command determined based on the input text.

15. A system of generating a program based on vocal input, the system comprising:

one or more computer-readable storage media having instructions stored thereon; and one or more processors communicatively coupled to the one or more computer-readable storage media and configured to cause the system to perform operations in response to executing the instructions stored on the one or more computer-readable storage media, the operations comprising:

obtaining vocal input that includes conversational language describing a computer program to be generated;

generating input text based on the vocal input, wherein the input text is representative of the conversational language describing the computer program;

generating a plurality of intent layout fragments based on the input text;

generating a plurality of intent generation models that each include at least first and second intent layout fragments of the plurality of intent layout fragments;

determining an intent machine score for each intent generation model based on a mathematical combination of a scalar multiplier, a rectified linear function, learned weight matrices, the input text, the intent layout fragments included in the intent generation model, and a feature vector representing the intent layout fragments;

generating an intent layout based on the intent generation model having a highest intent machine score;

generating an execution layout based on the intent layout, wherein the execution layout includes computer programming language based on the first intent layout fragment, the second intent layout fragment, and a third command related to at least one of the first and second intent layout fragments; and generating the computer program based on the computer programming language included in the execution layout.

16. The system of claim 15, wherein generating a plurality of intent layout fragments based on the input text and generating a plurality of intent generation models comprise:

determining different parts of speech that are included in the input text, wherein each intent layout fragment is based on one of the determined different parts of speech included in the input text: and wherein each of the intent generation models associates the two or more intent layout fragments with each other.

17. The system of claim 15, wherein generating the intent layout based on the input text comprises:

determining different parts of speech that are included in the input text; receiving world information based on the different parts of speech included in the input text, wherein the world information describes subject matter corresponding to the different parts of speech;

receiving a command inventory for associating the subject matter described in the world information, wherein the command inventory includes different types of commands for associating the different parts of speech; and generating the intent layout based on the world information, the command inventory, and the input text.

18. The system of claim 15, wherein generating the execution layout based on the intent layout comprises:

receiving program information based on the first and second intent layout fragments included in the intent layout, wherein the program information describes computer program functions corresponding to the first and second intent layout fragments included in the intent layout;

receiving a program inventory based on the computer program functions described in the program information, wherein the program inventory includes multiple computer program functions;

generating an execution layout fragment for each of the computer program functions; generating a plurality of execution generation models based on the execution layout fragments;

determining an execution machine score for each execution generation model; and generating the execution layout further based on the execution generation model having a highest execution machine score.

19. The system of claim 17, wherein the execution machine score for two or more execution generation models is the same, the operations further comprising:

determining an execution user score for each execution generation model; and determining a combined execution score for each execution generation model based on the execution machine score and the execution user score, wherein the execution layout is generated based on the execution generation model having a highest combined execution score.

* * * * *